United States Patent [19]
Rose

[11] Patent Number: 5,537,117
[45] Date of Patent: Jul. 16, 1996

[54] CLOSED LOOP COUNTERMEASURE TO PASSIVE DIRECTION FINDING AND LOCATION OF RADAR TRANSMITTERS USING DOPPLER TECHNIQUES

[75] Inventor: Conrad M. Rose, Dahlgren, Va.

[73] Assignee: Litton Systems, Inc., Woodland Hills, Calif.

[21] Appl. No.: 512,447

[22] Filed: Aug. 8, 1995

[51] Int. Cl.$^6$ .................................................. G01S 7/36
[52] U.S. Cl. .................................................. 342/17; 342/18
[58] Field of Search .................................. 342/13, 16, 17, 342/18, 19

[56] References Cited

U.S. PATENT DOCUMENTS

| | | | |
|---|---|---|---|
| 3,702,476 | 11/1972 | Nathanson et al. | 342/195 |
| 3,720,952 | 3/1973 | Lawsine | 342/15 |
| 3,891,989 | 6/1975 | Barney et al. | 342/201 |
| 4,068,235 | 1/1978 | Peters, Jr. et al. | 342/15 |
| 4,072,944 | 2/1978 | Bianco et al. | 342/16 |
| 4,257,108 | 3/1981 | Igel | 364/900 |
| 5,241,313 | 8/1993 | Shaw et al. | 342/13 |
| 5,315,307 | 5/1994 | Tsui et al. | 342/444 |

Primary Examiner—John B. Sotomayor
Attorney, Agent, or Firm—Gerald L. Lett

[57] ABSTRACT

Method and apparatus for enabling a pulse echo radar to generate a false signal in both time and frequency based passive Doppler ESM location systems. The latter false signal causes the ESM system to mislocate the radar. The radar's reference oscillator frequency is varied to create false passive Doppler information at an intercept receiver. These variations are predetermined changes in RF and PRF frequencies for the radar and are relatively small compared to those frequencies.

9 Claims, 4 Drawing Sheets

CLOSED LOOP COUNTERMEASURE TO PASSIVE DIRECTION FINDING AND LOCATION OF RADAR TRANSMITTERS USING DOPPLER TECHNIQUES

BACKGROUND OF THE INVENTION

This invention relates to radar electronic counter-counter measure systems (ECCM). In particular it relates to the defeat of sensitive electronic surveillance measure (ESM) intercept receivers attempting to locate the radar emitter in angle or range by comparing measured Doppler shifts in the radar's signal. The invention is used when an observing aircraft, which may be using such Doppler locating techniques, has been detected and is being tracked by the radar.

This invention applies to all pulse echo radars susceptible to passive Doppler location, but most particularly to pulse amplifier radars, such as that shown in FIG. 1. Such radars are typically used in fire-control systems to track targets. In radars using multiple pulse repetition frequencies (PRFs) to resolve range ambiguities, $f_{prf}$ represents the highest frequency. A common approach in such radars to eliminate range ambiguities in the received signal is to make the different PRFs relatively prime integer multiples of a fundamental time interval $t_p$, where $t_p$ is equal to $1/f_{prf}$. The true range is then found by a decoding scheme typically based on the Chinese remainder theorem in modulo arithmetic. The set of pulses used to resolve the range ambiguity form a frame. The frame may be periodically repeated, giving rise to a frame repetition interval (FRI) as well as the basic pulse repetition interval $t_p$.

Passive Doppler methods, such as the angle estimation method described in U.S. Pat. No. 5,241,313 by Shaw et al, can utilize a pulse deinterleaver to extract $t_p$ from the pulse time of arrival (TOA) measurements made by an ESM intercept receiver. The change in $t_p$ from measurements at one location to measurements made at another location can then be utilized by a TOA passive Doppler algorithm to locate the emitter in angle and range.

A co-pending, commonly assigned U.S. Patent application by the same inventor describes a technique for preventing passive DF and location of the radar transmitter using passive Doppler techniques. The above-referenced application is entitled "Open Loop Countermeasure to Passive Direction Finding and Location of Radar Transmitters Using Doppler Techniques". In particular, the technique described in the latter application makes no changes to the relative integer spacings in the existing PRI structure within a frame repetition interval or FRI, but only alters PRF or RF at the beginning of a new FRI, and only after all previously transmitted pulses have been received. The RF carrier frequency is altered as well as the PRF, to prevent detection by a passive RF frequency Doppler technique such as that of Tsui et al, U.S. Pat. No. 5,315,307 "Doppler Frequency Angle Measurement", which could be used in conjunction with the time based technique to check for countermeasures.

These desirable features are also incorporated into the current invention. But the technique disclosed in the referenced application was termed an "open loop" approach because a fundamental assumption was that the ESM system detected the radar, but the radar had not detected the observer. If the radar has acquired and is tracking an observer attempting passive Doppler location a closed loop countermeasure is available, according to the invention, where "closed loop" refers to the feedback of target range, speed and heading information to the passive Doppler ECCM system. Utilization of this tracking information allows the radar to control the angle and range estimate made by the observer's passive Doppler ESM system, rather than just cause that system to produce random false radar-to-observer relative bearing angles, as in the open loop approach.

Therefore, an object of this invention is to provide a method and apparatus for enabling a pulse echo radar to generate a false signal in both time and frequency based passive Doppler ESM location systems, where the false signal places the radar at a spurious geolocation predetermined by the radar ECCM system. In particular, this spurious location can be chosen to optimize some aspect of the radar system operation, such as maximizing the likelihood of successful missile intercept of the observer attempting to Doppler locate the radar.

SUMMARY OF THE INVENTION

In meeting this and other objects the invention makes use of the fact that the change in the Doppler shift the observer is attempting to measure is only, at the most, several hundred Hertz if RF carrier Doppler is being used, and fractions of a Hertz if time, or equivalently, PRF Doppler techniques are employed. Therefore the frequency changes in the radar required to prevent the passive extraction of correct Doppler changes are small compared to the RF and PRF frequencies the radar employs. Thus modulating these frequencies represents only a small perturbation to the normal operating frequencies used by the radar, and need not alter the operational use of the radar, or its performance if the perturbation is correctly done.

To create these perturbations, this invention varies a reference oscillator frequency in a manner that creates false passive Doppler information at the intercept receiver.

The properties of the perturbing signal, and its effect, are derived as follows. The signal parameter measured in passive frequency Doppler location is $$f = f_o \left[ \left( 1 - \frac{\vec{v} \cdot \vec{u}}{c} \right) \right]^{-1} \qquad (1a)$$

while for TOA passive Doppler the signal measured ultimately is $$t_p = t_{po} \left( 1 - \frac{\vec{v} \cdot \vec{u}}{c} \right) \qquad (1b)$$

Hence time and frequency Doppler changes involve an essentially reciprocal relation, and so only the effect on Equation (1a) arising from the proposed perturbations needs to be discussed. But although the following description focuses on $f_o$, it is to be understood that the same perturbations are applied to $f_{prf}$ in the most desirable implementation of this invention.

It is important to note the radar requires reference oscillator coherence only over milliseconds, whereas Doppler passive location methods need signal coherence over seconds. Therefore the RF or PRF reference oscillator frequency can be changed several times in the interval needed to direction find (DF) or locate the emitter in range without violating the radar coherence requirement.

The passive Doppler DF or location algorithm expects to see a signal of the form of Equation (1) for all its measurements. The invention changes $f_o$ (120, FIG. 1) during the Doppler estimation process according to $$\Delta f_o = f_o \frac{\vec{v}_p}{c} (\vec{u}_f - \vec{u}_p) \quad (2)$$

(200 FIG. 2). In this equation $\vec{v}_p$=predicted velocity provided by the radar tracking algorithm $\vec{u}_p$=predicted normalized range vector $\vec{u}_f$=false position normalized range vector c=speed of light Then the signal actually measured is $$(f_o + \Delta f_o) \left(1 - \frac{\vec{v} \cdot \vec{u}}{c}\right)^{-2}$$

which to the relativistic approximation commonly used is $$f_o \left(1 + \left(\frac{\vec{v} \cdot \vec{u}_f}{c}\right)\right) \quad (3)$$

This signal has the same form as Equation (1a) to order $v^2/c^2$ and higher, and hence a passive Doppler location algorithm would solve for the spurious emitter location $\vec{u}_f$.

As a means to detect these perturbations in time or frequency the observer could simultaneously use both a frequency Doppler technique such as that of Tsui et al on the RF carrier or a time-based technique such as Shaw et al on the PRF and compare results. To defeat this simple countermeasure it is desirable to perturb both the PRF reference oscillator and the RF carrier oscillator by the same pulling signal. The method and apparatus for carrying out a simultaneous perturbation for a pulsed oscillator radar was described in detail in the above referenced co-pending patent application entitled "Open Loop Countermeasure to Passive Direction Finding and Location of Radar Transmitters Using Doppler Techniques".

BRIEF DESCRIPTION OF THE DRAWINGS

The principles of the invention will be more readily understood from the following description of a preferred embodiment constructed accordingly and the drawings which are briefly described as follows.

DETAILED DESCRIPTION OF THE DRAWINGS

Figure 1:
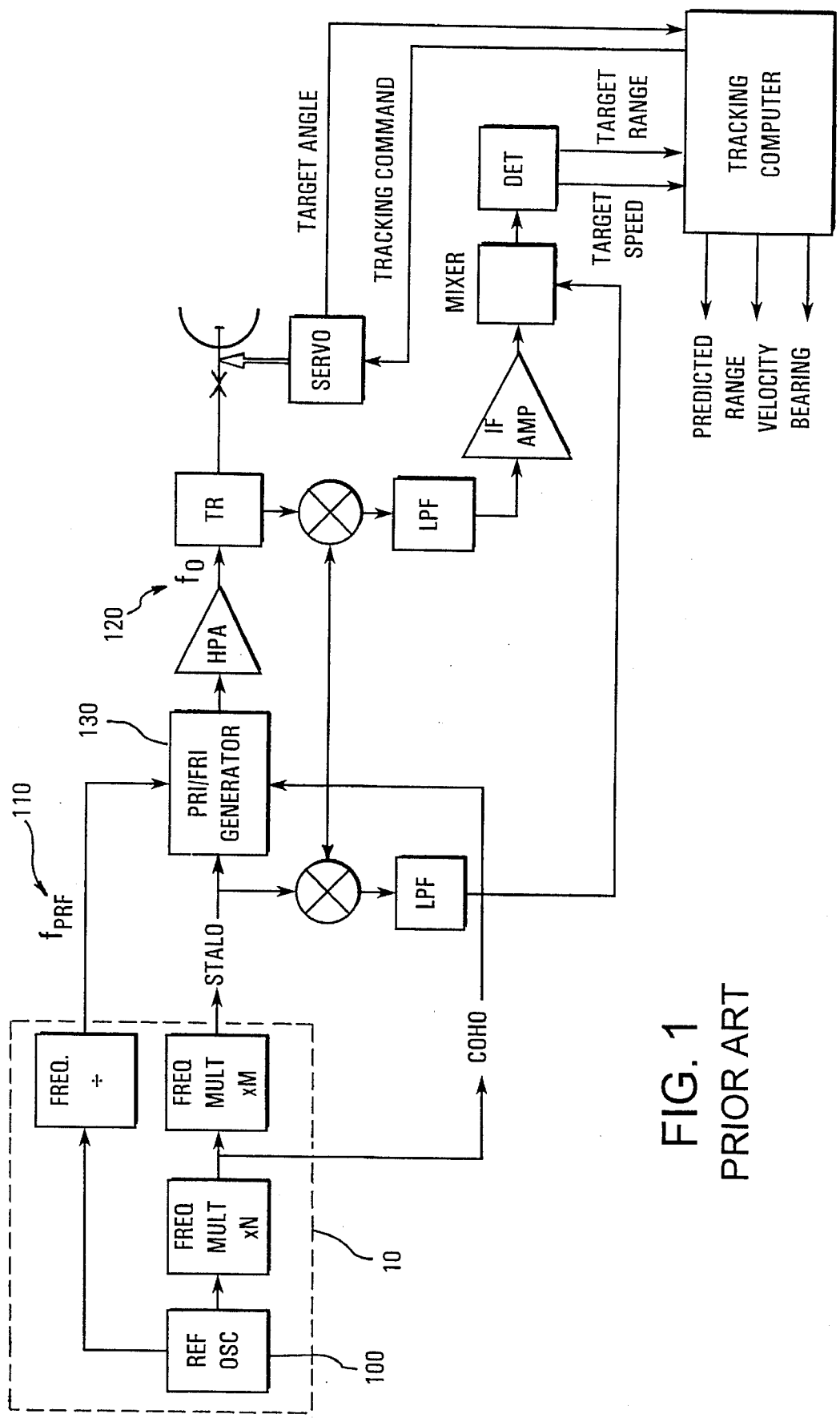
FIG. 1 is a block-schematic diagram of a prior art pulsed amplifier radar representative of those used for target tracking in surface-to-air missile (SAM) systems, or airborne intercept systems, and typical of the type of radar passive Doppler locating methods can be used against.

As discussed briefly above, FIG. 1 illustrates a typical pulse amplifier radar, such as might be used in fire control systems. Of particular interest herein, such systems include a reference oscillator 100 which generates both the fundamental pulse repetition frequency 110 ($f_{prf}$) which is used by PRI/FRI generator 130 to produce $f_o$ appearing at 120.

The remainder of the FIG. 1 system is of known construction and operation and will not be described in detail, other than as necessary to describe this invention.

Figure 2:
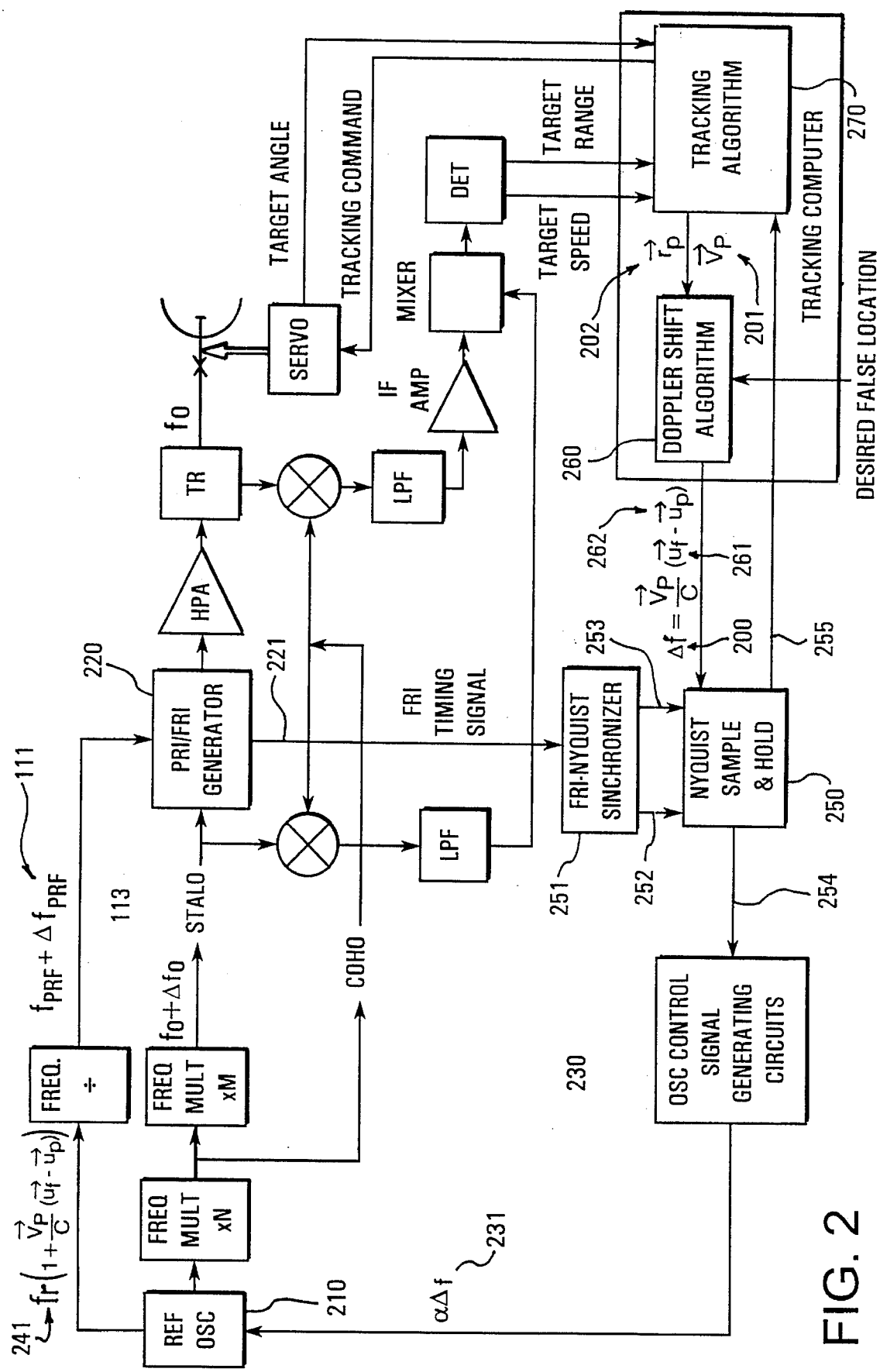
FIG. 2 is a block-schematic diagram of a preferred embodiment of the invention showing the modifications made to the FIG. 1 radar to defeat passive Doppler methods according to the invention by creating a spurious radar location.

FIG. 2 shows the modifications made to the FIG. 1 pulse amplifier radar according to the invention. In the original system shown in FIG. 1, hardware modifications are typically required to the frequency synthesis circuit 10 and the PRI/FRI generator 130. The reference oscillator 100 is replaced by a signal controlled oscillator (210, FIG. 2) where the signal may be either a digital word or voltage. The PRI/FRI Generator is replaced by the programmable and frequency controllable pulse generator 220 (FIG. 2). A suitable device for this purpose is similar to that of Igel described in U.S. Pat. No. 4,257,108. The control frequency 241 from the reference oscillator 210, which varies with the pulling signal 231 controlled by 200, determines the basic pulse spacings generated by this device.

The function of the reference oscillator 100 in the system illustrated in FIG. 1 is to provide the fundamental time interval $t_{po}$ from which the pulse timing is generated by the PRI/FRI Generator 130, and to provide the RF carrier frequency. Therefore, altering the frequency of this oscillator changes both the RF and the PRF by proportionally the same amount. An example of a suitable replacement oscillator 210, FIG. 2, is the Stanford Telecom model STEL-1175 60 MHz 32-bit CMOS modulated numerically controlled oscillator.

This oscillator can have its frequency changed or "pulled" with a 14 milli-Hz resolution. In the invention the frequency of the oscillator is set by a source, which is ultimately the Doppler shift algorithm 260, but is directly the control signal 231. The control signal has an amplitude variation that controls the PRF 112 or RF 114 frequency perturbations about the original operating frequencies. Examples of these perturbations are shown in FIG. 3.

The basic control signal is generated as follows. An existing tracking algorithm 270 typically already predicts future target position 202 and velocity 201, since these quantities are needed to perform the tracking and fire control function of the radar. But this tracking algorithm may be implemented as an α-β filter or other suboptimal estimator that accepts only fixed update or prediction times. This invention uses the target motion predictor in the tracking algorithm 270 to generate predicted position and velocity values in the Doppler shift algorithm 260. The prediction time is variable, depending on the interaction of the FRI-Nyquist Synchronizer 251 and Nyquist Sample and Hold 250, as described below. Therefore the tracking filter may have to be augmented by a minimum variance predictor that extrapolates current estimates of target range and velocity over arbitrary times. The predicted kinematical values are then used to determine the unit pointing vector 261, or equivalently false signal DOA vector $\vec{u}_f$, the vector lying along the direction from the aircraft to the false radar location. The predicted range is also used to find $\vec{u}_p$, the true predicted DOA vector 262, and these quantities in turn are used to generate the frequency perturbation control signal 200 according to the relation $$\Delta f = \frac{\vec{v_p}}{c} (\vec{u_f} - \vec{u_p}) \qquad (4)$$

The predicted time relative to the current time for which the target range 202 and velocity 201 values are estimated is determined by the signal 255 from the Nyquist Sample and Hold. This signal indicates if a sample of control signal 200 is to be made. The predicted range and velocity is then made for a time equal to the current time plus half the average Nyquist sample time, where the average Nyquist sample time is a time interval intrinsic to the Nyquist Sample and Hold, as described below.

The Nyquist Sample and Hold 250, along with the FRI-Modulator Synchronizer 251, and the Oscillator Control Signal Generating Circuit 230 are required to prepare the actual reference oscillator pulling signal 231 from the basic control signal 200 in a way that does not affect radar operation, but does cause observers using passive Doppler to mislocate the radar.

The Nyquist Sample and Hold's function is to exploit the fact the radar requires reference oscillator coherence only over the time required for a pulse round trip, i.e. only over milliseconds, whereas Doppler passive location methods compare multiple changes in signal Doppler resulting from observer attitudinal and translational position changes, and hence require signal coherence over seconds. The passive Doppler algorithm therefore has a certain nominal maximum bandwidth, and hence the reference oscillator frequency changes only have to be made in a manner consistent with this lowpass bandwidth. The passive Doppler estimation algorithm will then reproduce the continuous effect of the signal 200, according to the Shannon sampling theorem. Although the effective bandwidth may vary with time into the estimation process for a particular passive Doppler algorithm, and will vary from one algorithm to another, the sample rate just has to be a lower bound on the Nyquist rate for any possible algorithm, and therefore can be derived from the Cramer-Rao bound for passive Doppler angle or range estimation. This leads to a sample rate on the order of 0.25 seconds.

The Nyquist Sample and Hold samples the basic control signal 200 at the average Nyquist rate determined by the Cramero-Rao bound, but it does this in a manner consistent with the pulse processing done by the radar. This may involve pulse integration or other batch processing techniques. The frame repetition interval (FRI) timing signal 221 is the time event marker signaling the start of a new batch of pulse processing. For instance, in an acquisition radar scanning in azimuth at fixed elevations, it may be the signal signifying a change in elevation frame. For a tracking radar such as that shown in FIG. 1, it may be the end of a repeating multiple pulse repetition interval (PRD pattern. In all radars of interest for this invention the coherent pulse processing time is much shorter than the Nyquist sample rate of the passive Doppler algorithm. The Nyquist Sample and Hold 250 varies its sample times to occur at the start of the closest FRI timing signal 221. Such synchronization is a common task in digital circuit design, and is accomplished using a standard sequential logic circuit 251 that accepts a square wave signal 252, where the leading edges of the square waves represent timing marks at the average Nyquist rate desired, and shifts these edges to coincide with the FRI events in signal 221, creating the sample timing signal 253. The adjusted Nyquist signal 253 causes a sample 254 of the higher rate control signal 200 to be made. The time the sample is to be made plus half the most recent average of the Nyquist sample rate, adjusted for processing delays, is sent 255 to the target tracking algorithm as the prediction time for which the kinematical estimates 201 and 202 are needed.

The resulting sampled and FRI-synchronized control signal 254 then drives the Oscillator Control Generating Circuit 230. This circuit scales the sampled control signal as required for the modulated reference oscillator chosen. Hence the output may be a digital word or a voltage, as appropriate for the device 210. The reference frequency 241 is thus caused to change about the nominal value fr according to $$f_r \rightarrow f_r \left( 1 + \frac{\vec{v_p}}{c} (\vec{u_f} - \vec{u_p}) \right) \qquad (5)$$

This signal is scaled up to produce the RF carrier 113, and typically scaled down to produce the fundamental PRF 111.

If a frequency Doppler DF technique such as that described by the Tsui patent is used in conjunction with a time Doppler DF method to produce bearings that are separately input to a bearings-only range estimator, both will generate the same erroneous range since pulse frequency and pulse TOA are perturbed by the same control signal 200. Therefore the presence of the signal 200 is not detectable by comparing time and frequency Doppler results.

Figure 3B:
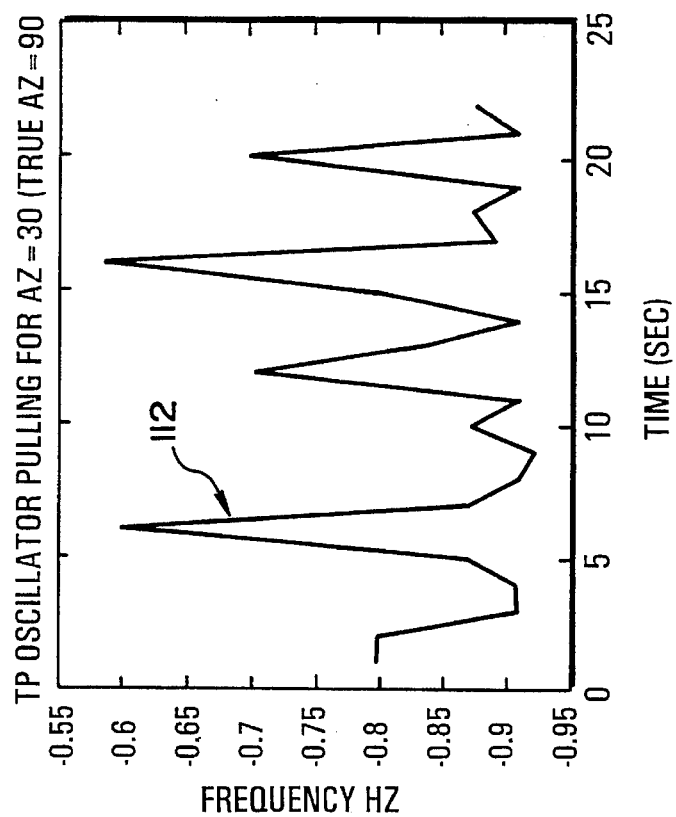
FIGS. 3a and 3b are time-frequency diagrams illustrating, respectively, the change in the RF and PRF at one second intervals due to the pulling signal on the FIG. 2 reference oscillator introduced according to this invention.
Figure 3A:
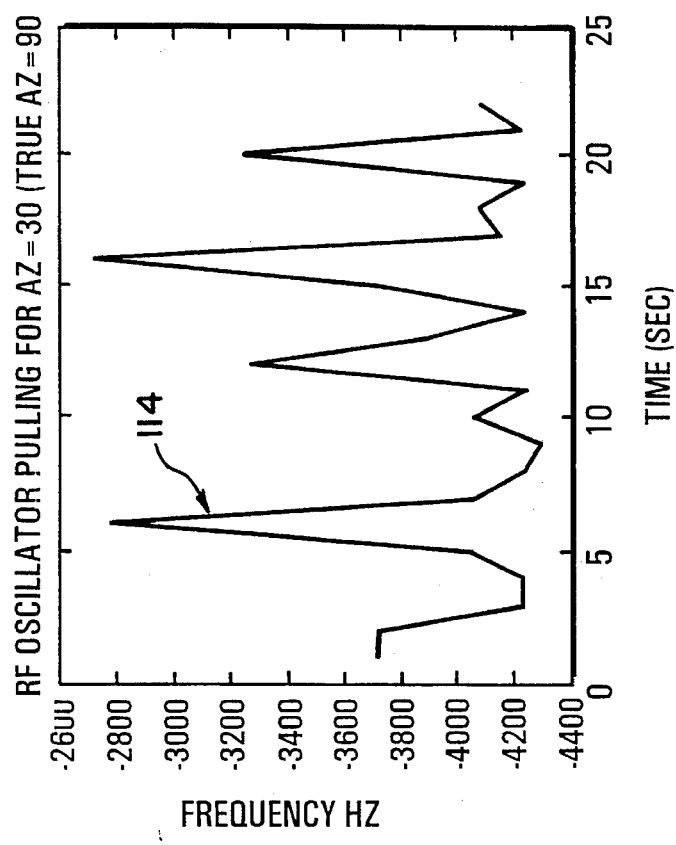
Figure 4A:
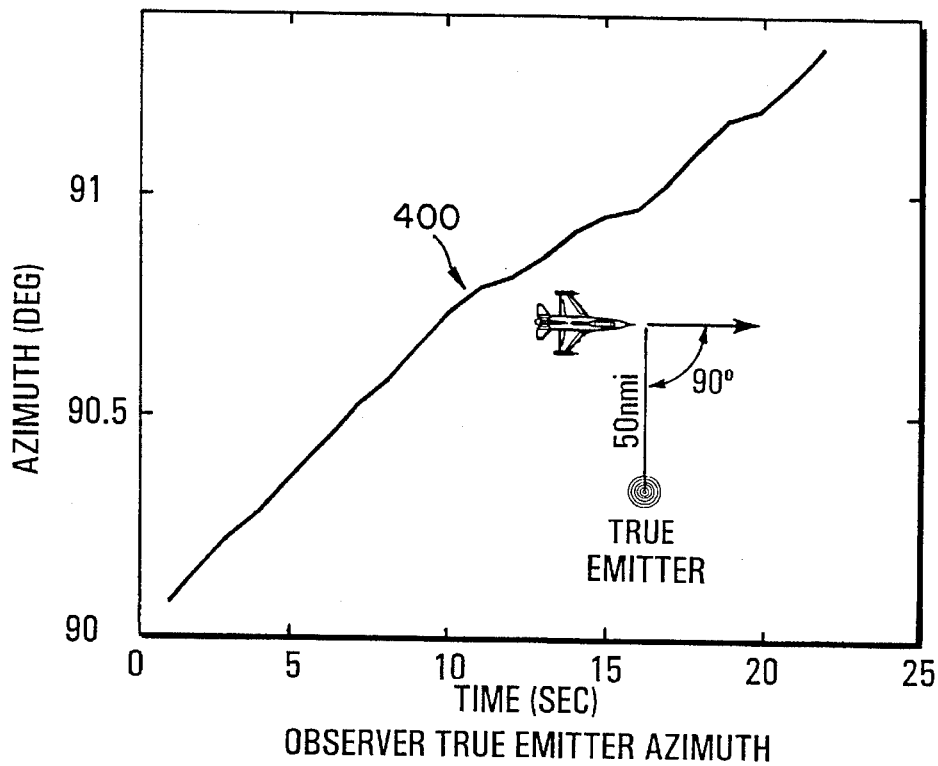
FIG. 4a is an azimuth-time diagram showing the passive Doppler estimated range for the radar of FIG. 1 found utilizing a prior art time Doppler approach.
Figure 4B:
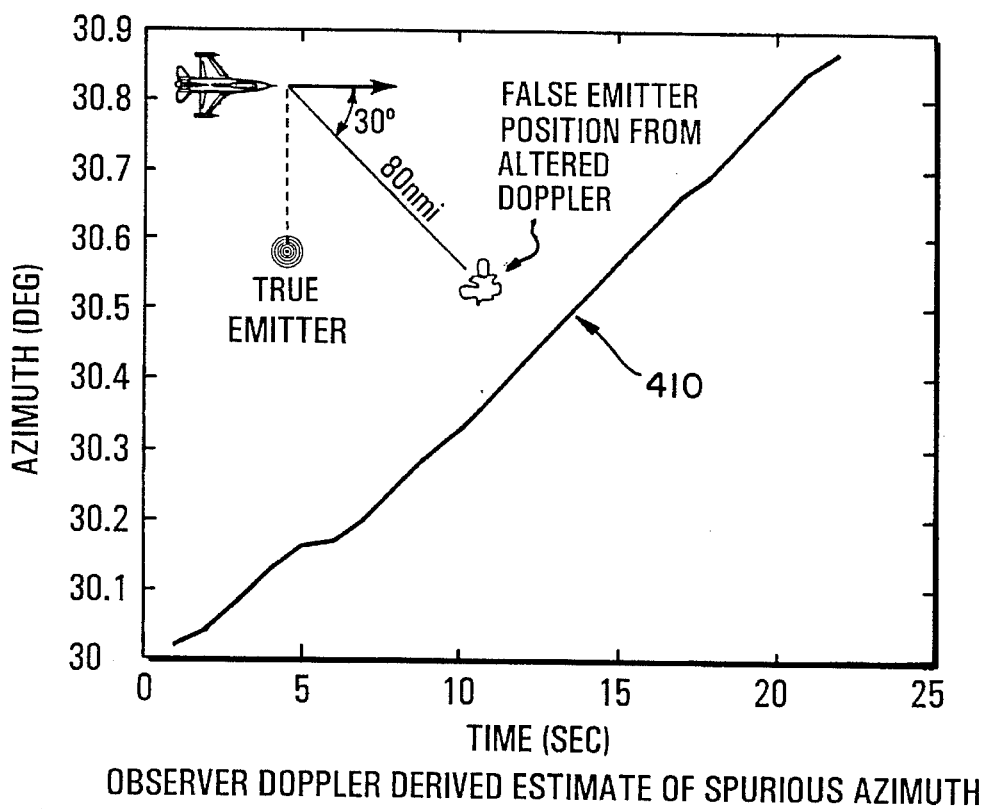
FIG. 4b is an azimuth-time diagram showing the result using the same scenario and algorithm as that used to generate the results of FIG. 4a, but using the FIG. 2 embodiment and the principles of the invention.

FIG. 4 illustrates the effect this control signal has on emitter range and angle estimation. The 10 GHz emitter is actually 50 nmi from the observing aircraft with a relative beating of 90°. FIG. 4a shows the result of estimating target bearing for the unmodified radar of FIG. 1 using a TOA passive Doppler approach, similar to that of the Shaw patent. The range to the emitter is found from the slope of the estimated azimuth curve 400, and the observer speed of 200 kts, to be about 54 nmi. For the same scenario, but system modified according to this invention as shown in FIG. 2 and described above, the same location algorithm gives the spurious result show in FIG. 4b. The control signals are shown in FIG. 3. The TOA control signal 112 of FIG. 3a, corresponding to the PRF frequency 111 in FIG. 2, generated this result. The spurious relative bearing is seen to be 30°, and the slope of the azimuth estimate curve 410 and 200 kt observer speed give a false range of about 78 nmi. If a frequency based passive Doppler ranging approach such as that of the Tsui patent is used, the RF perturbation 114 of FIG. 3b, corresponding to RF frequency 113 in FIG. 2, would produce the same result.

The principles of the invention have been described by describing a preferred embodiment constructed accordingly. It is to be understood that the described embodiment can be modified or changed in ways known to those skilled in the art while remaining within the scope of the invention as defined by the appended claims.

I claim:

1. Method for modifying a radar emitter signal to have characteristics causing the false location of the emitter by an observer using passive Doppler geolocation techniques, comprising the steps of:

producing deterministic control signals according to target range and velocity as determined by the radar and according to a desired false location of the emitter;

generating a variable reference frequency responsive to said control signals providing a coherent frequency at least one of the radar emitter's RF carrier signal and pulse timing;

reproducing the radar emitter's relative integer spacing for the pulse train from its pulse generating circuit under the control of frequency variations of said control signals;

sampling said control signals at the average Nyquist rate corresponding to the largest bandwidth occurring over a passive Doppler estimation time interval at the observer;

synchronizing said sampling step with timing events corresponding to the processing of signals being received by the radar and scaling and converting the sampled control signals to a digital word for controlling said reference frequency to create a change in said reference frequency equal to the product of the value of the control signal and the current value of said reference frequency.

2. The method described in claim 1 wherein said Nyquist rate sampling commences at the start of a pulse repetition interval for the radar emitter.

3. The method described in claim 1 comprising the additional step of:

inserting a dead-time interval into the pulse sequence produced by said reproducing step at a point therein before said sampling step has caused a change in the reference frequency and when all pulses transmitted by the emitter return before any emitter frequency change occurs.

4. The method described in claim 1 wherein said predicted target range and velocity are derived from the optimal minimum variance target estimator for the class of targets encountered by the radar, the prediction time of the target kinematics being determined by the additional steps of:

estimating the most recent average sample period for said sampling step and producing a said control signal based on at least the current average sample period.

5. The method claim 1 where the same said deterministic control signal changes the RF carrier frequency and the PRF frequency be varying the output of a common reference oscillator, so that the presence of the signal cannot be detected by comparing simultaneous RF and PRF passive Doppler location results, comprising the additional steps of:

producing a control signal for the reference oscillator that nulls the Doppler change measured by an intercept receiver on a observer moving with velocity $\vec{v}$, where the observer expects to measure a frequency signal of the form $$f = f_o \left[ \left( 1 - \frac{\vec{v} \cdot \vec{u}}{c} \right) \right]^{-1}$$

or time signal of the form $$t_p = t_{po} \left( 1 - \frac{\vec{v} \cdot \vec{u}}{c} \right);$$

producing a control signal for the reference oscillator applied in addition to the above nulling signal that causes the intercept receiver to estimate a spurious Doppler change, where this spurious Doppler is consistent with a false position of the emitter, this false emitter position being such that it aids the radar system according to the need to either destroy the observer carrying the intercept receiver, or to avoid destruction by it.

6. In a radar emitter, apparatus for modifying the emitter's radar signal to create false geolocation information concerning the emitter at a receiver using passive Doppler locating techniques, the apparatus comprising:

a source of deterministic control signals for adjusting the radar emitter signal according to target range and velocity as determined by the radar and according to the desired false location of the emitter;

a radar frequency synthesis circuit including a variable reference frequency source responsive to said control signals for providing a coherent frequency reference for at least one of the emitter RF carrier and pulse time;

a frequency controlled pulse generator responsive to frequency changes in said control signals for reproducing relative integer spacings of the emitter pulse train;

sample and hold means for sampling the output of said source of deterministic control signals at the average Nyquist rate corresponding to the largest bandwidth occurring over a predetermined time interval related to a passive Doppler estimation interval at the receiver;

means for synchronizing sampling by said sample and hold means with timing events corresponding to received signal processing in the radar; and means for scaling and converting a sample of said control signals from said sample and hold means to a signal compatible with a control input to said variable reference frequency source thereby causing a change in frequency of said variable reference frequency source equal to the control signal value times the current reference frequency source frequency.

7. The apparatus described in claim 6 wherein said predicted target range and velocity is derived from the radar's target state estimator for the class of targets being engaged.

8. The apparatus described in claim 6 wherein said variable reference frequency source produces analog signals.

9. The apparatus described in claim 6 wherein said variable reference frequency source produces digital signals.

* * * * *